United States Patent [19]
Hewson et al.

[11] 4,319,492
[45] Mar. 16, 1982

[54] PRESSURE TRANSMITTER MANIFOLD

[75] Inventors: John E. Hewson; Marion L. Schomer, both of Houston, Tex.

[73] Assignee: Anderson, Greenwood & Co., Bellaire, Tex.

[21] Appl. No.: 114,572

[22] Filed: Jan. 23, 1980

[51] Int. Cl.³ .............................................. G01L 7/00
[52] U.S. Cl. ..................................................... 73/756
[58] Field of Search ........................ 73/756, 714, 115; 137/340, 886, 883

[56] References Cited

U.S. PATENT DOCUMENTS

| | | | |
|---|---|---|---|
| 1,272,344 | 7/1918 | Bristol | 73/756 |
| 1,532,253 | 4/1925 | Meredith et al. | 137/883 |
| 1,797,591 | 3/1931 | Sartakoff | 73/756 |
| 2,871,881 | 2/1959 | Hewson | 73/861.42 |
| 3,118,463 | 1/1964 | Lacart | 137/886 |
| 3,499,464 | 3/1970 | Williams et al. | 137/883 |
| 4,182,362 | 1/1980 | Hewson et al. | 137/340 |

Primary Examiner—Donald O. Woodiel
Attorney, Agent, or Firm—Vinson & Elkins

[57] ABSTRACT

A pressure transmitter manifold having a block with an inlet in communication with a pair of outlets, valve means controlling communication between the inlet and said outlets, valve controlled bleed and test connections in communication with said outlets and means for supporting said manifold block in a preselected position.

7 Claims, 5 Drawing Figures

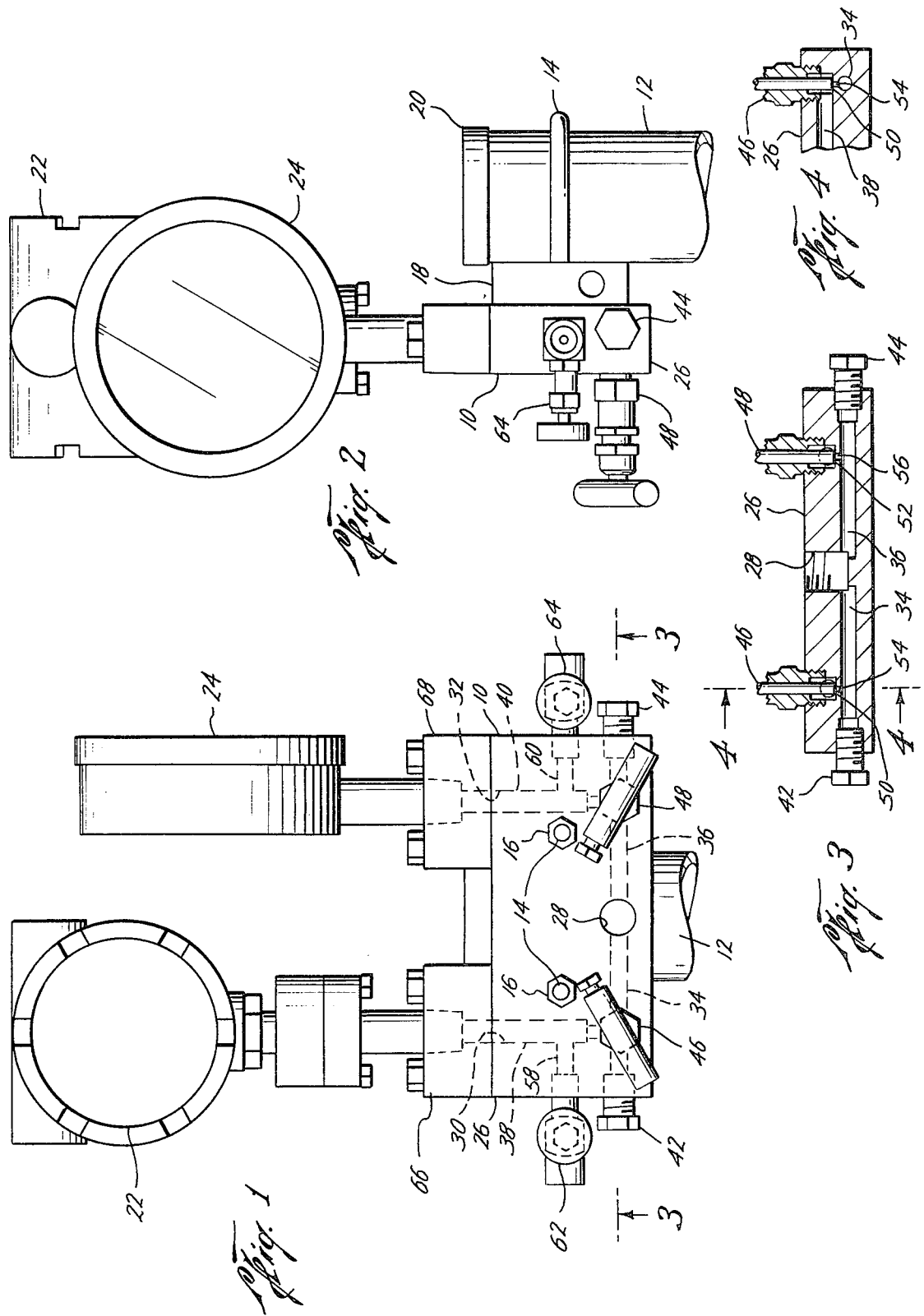

PRESSURE TRANSMITTER MANIFOLD

BACKGROUND OF THE INVENTION

Manifold structures have been used in the past to provide support for a pressure transmitter and to conduct to the transmitter such pressure or pressures to which it is designed to respond with an output signal. Prior transmitter manifolds have provided purge connections and a valve to close the passage through the manifold to the transmitter so that the transmitter can be removed without a shut-down of the system.

SUMMARY

The present invention provides an improved pressure transmitter manifold having provision for the mounting of two pressure transmitters to provide redundancy and also the capability of isolation either or both of the transmitters and with a bleed connection between the isolating valves and the transmitters.

An object of the present invention is to provide an improved pressure transmitter manifold allowing transmitter redundancy.

Another object is to provide an improved pressure transmitter manifold which allows a second transmitter or a pressure gauge to be used and either or both may be isolated from the inlet connection.

BRIEF DESCRIPTION OF THE DRAWINGS

These and other objects and advantages are hereinafter set forth and explained with reference to the drawings wherein:

FIG. 1 is an elevation view of the improved pressure transmitter manifold of the present invention shown with a pressure transmitter and a pressure gauge connected thereto.

FIG. 2 is a side elevation view of the apparatus shown in FIG. 1.

FIG. 3 is a sectional view of the manifold block taken along line 3—3 in FIG. 1.

FIG. 4 is a sectional view of the manifold block taken along line 4—4 in FIG. 3.

DESCRIPTION OF THE PREFERRED EMBODIMENT

Figure 5:
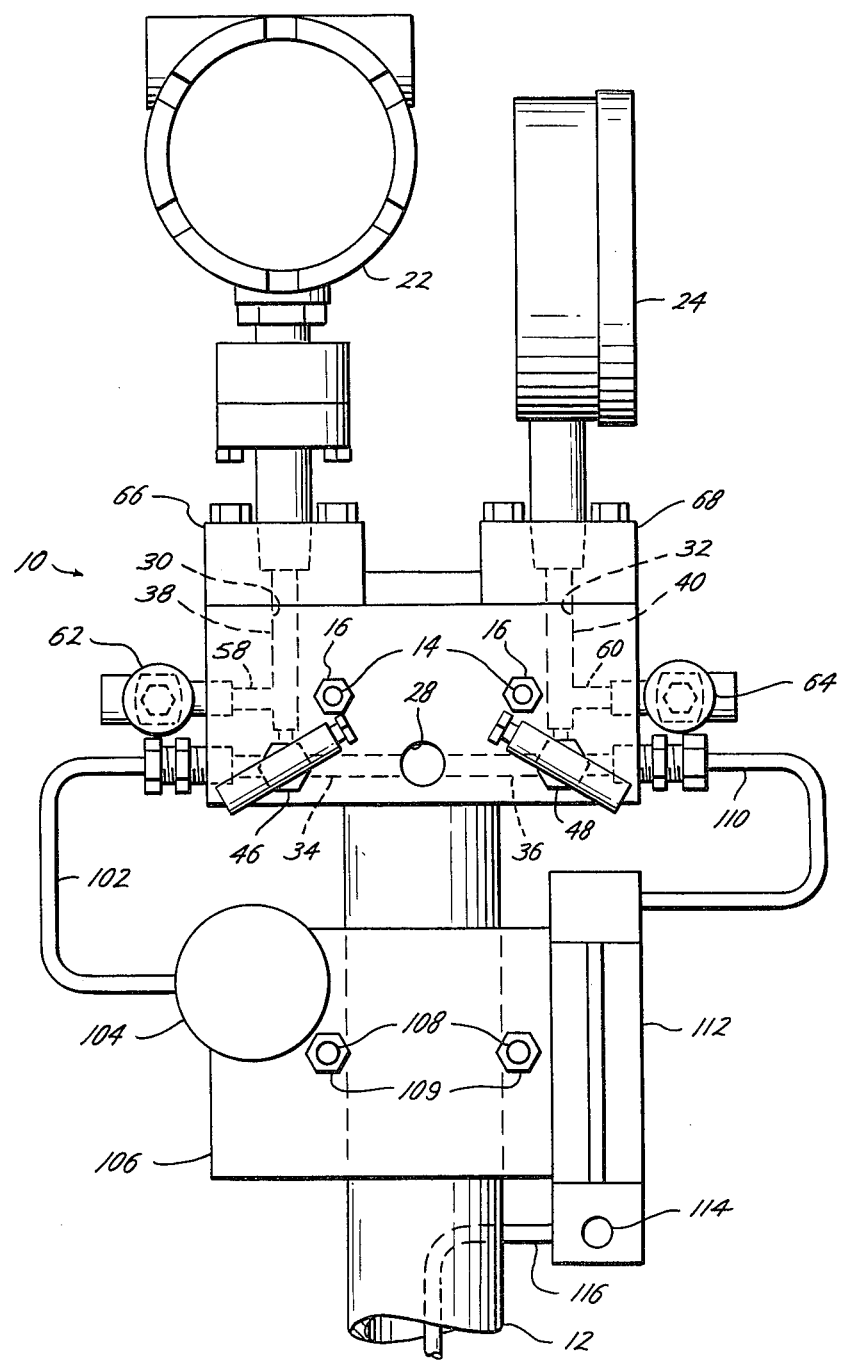
FIG. 5 is an elevation view of a modified form of the improved pressure transmitter manifold similar to FIG. 1 and having a pressure switch and purge system connected into the plugged passageways.

Pressure transmitter manifold 10 is supported from stand 12 by U-bolt 14 and nuts 16. U-bolt 14 extends around stand 12 and both ends extend through manifold 10 and steam heater block 18 and nuts 16 threaded onto the U-bolt ends to secure manifold 10 in the desired position. Cap 20 closes the upper end of stand 12 which is shown to be tubular but may be solid and have any type of section such that U-bolt 14 surrounds stand 12 to support manifold 10 in its preselected position.

Manifold 10 is adapted as hereinafter explained to provide communication to pressure transmitter 22 and to pressure gauge 24 from a source (not shown). This communication is established through manifold block 26 from inlet 28 to outlet ports 30 and 32. Transverse passages 34 and 36 are in communication with inlet 28 and with passages 38 and 40, respectively, which communicate to ports 30 and 32 as shown. Plugs 42 and 44 are threaded into block 26 to close the ends of passages 34 and 36. Valves 46 and 48 are positioned in block 26 to control communication through passages 38 and 40 as best seen in FIGS. 3 and 4.

Valves 46 and 48 are threaded into block 26 so that their valve members engage seats 50 and 52 surrounding ports 54 and 56 which connect passages 34 and 38 and passages 36 and 40. Thus, as shown, ports 54 and 46 each form one passage of valves 46 and 48 and passages 38 and 40 each form the other passage of valves 46 and 48 so that valve 46 controls communication between inlet 28 and port 30 and valve 48 controls communication between inlet 28 and port 32.

Passages 58 and 60 in block 26 connect with passages 38 and 40, respectively, and valves 62 and 64 are connected into the outer end of passages 58 and 60, respectively, to provide bleed and test connections to pressure transmitter 22 and gauge 24.

Suitable connecting means, such as oval or "foot ball" flanges 66 and 68, are used to provide connection of transmitter 22 and gauge 24 into block 26 in communication with ports 30 and 32 and with passages 38 and 40, respectively. Whenever desired, a second pressure transmitter may be installed on block 26 in place of gauge 24 to provide transmitter redundancy.

With the manifold 10 in operation with a source of fluid under pressure connected to inlet 28, valves 46 and 48 are normally open and valves 62 and 64 are normally closed. To isolate transmitter 22, valve 46 is closed and then valve 62 is opened to bleed transmitter 22 and passages 38 and 58. With no pressure remaining, transmitter 22 may be safely removed and serviced and replaced. When it is desired to re-establish communication to transmitter 22, valves 62 is first closed and then valve 46 is opened. Valve 62 may be cracked open to test whether pressure is being communicated to transmitter 22 and to purge the passages. The same procedure is used to isolate pressure guage 24 for its servicing or replacement with a pressure transmitter to provide the above-mentioned transmitter redundancy and to test and bleed or purge the passages.

The improved pressure transmitter 10' shown in FIG. 5 is identical with manifold 10 of FIG. 1 and all like parts bear the same number. Transmitter 10' does not include plugs 42 and 44 in the ends of passages 34 and 36. Rather line 102 is connected into passage 34 of manifold 10' which line 102 connects to pressure switch 104 mounted on plate 106 which is supported on stand 12 by U-bolt 108 and nuts 109. Pressure switch 104 is provided to shut down the system when a pressure condition exceeds preselected limits, either high or low, line 110 connects from passage 36 to purge fluid meter 112 which is also supported on plate 106. Control valve 114 controls the flow of a purge fluid from a suitable source such as line 116 which is conducted into manifold 10' to prevent corrosive or congealing fluids from entering the system of manifold 10 and transmitter 22.

What is claimed is:
1. A pressure transmitter manifold comprising
   a body,
   an inlet into said body,
   a pair of ports into said body,
   a first passage through said body between said inlet and one of said ports,
   a second passage through said body between said inlet and the other of said ports,
   said inlet supplying a common pressure to both of said ports, a first valve in said body controlling communication through said first passage, a second valve in said body controlling communication through said second passage, a first bleed connection into said block communicating with said first passage between said first valve and said connection, means closing said first bleed connection, a second bleed connection into said block communicating with said second passage between said second valve and said connection, means closing said second bleed connection, and means for mounting said block in a preselected position.

2. A pressure transmitter manifold comprising a body, an inlet into said body, a pair of ports into said body, a first passage through said body between said inlet and one of said ports, a second passage through said body between said inlet and the other of said ports, said inlet supplying a common pressure to both of said ports, a first valve in said body controlling communication through said first passage, a second valve in said body controlling communication through said second passage, a first bleed connection into said block communicating with said first passage between said first valve and said one of said ports, means closing said first bleed connection, a second bleed connection into said block communicating with said second passage between said second valve and the other of said ports, and means closing said second bleed connection.

3. A pressure transmitter manifold comprising a body, an inlet into said body, a pair of ports into said body, a first passage through said body between said inlet and one of said ports, a second passage through said body between said inlet and the other of said ports, said inlet supplying a common pressure to both of said ports, a first valve in said body controlling communication through said first passage, a second valve in said body controlling communication through said second passage, a pair of connections extending into said body, a portion of said first passage extending between said inlet and one of said connections, and a portion of said second passage extending between said inlet and the other of said connections, said portions of said passages by-passing said valves.

4. Apparatus for mounting a pressure transmitter comprising a manifold block having an inlet, a pair of outlets, passage means through said block connecting the inlet to the outlets, and means for isolating each outlet individually from the inlet, said inlet supplying a common pressure of both of said outlets, means for supporting said manifold block in a preselected position, a pressure transmitter connected into one of said outlets, a bleed connection into each of said connecting means between said outlets and said isolating means, and valve means controlling said bleed connections.

5. Apparatus for mounting a pressure transmitter comprising a manifold block having an inlet, a pair of outlets, passage means through said block connecting the inlet to the outlets, and means for isolating each outlet individually from the inlet, said inlet supplying a common pressure to both of said outlets, means for supporting said manifold block in a preselected position, a pressure transmitter connected into one of said outlets, a first connection into said passage means through said block, connecting at a point between said inlet and one of said isolating means, and a pressure switch connected to said first connection to provide shut-down if pressures at said inlet exceed preselected limits.

6. An apparatus according to claim 5 including a second connection into said passage means through said block connecting at a point between said inlet and the other of said isolating means, and a purge system connected to said second connection and having a source of purge fluid, a control valve and a purge fluid meter.

7. Apparatus for mounting a pressure transmitter comprising a manifold block having an inlet, a pair of outlets, passage means through said block connecting the inlet to the outlets, and means for isolating each outlet individually from the inlet, said inlet supplying a common pressure to both of said outlets, means for supporting said manifold block in a preselected position, a pressure transmitter connected into one of said outlets, a second connection into said passage means through said block connecting at a point between said inlet and the other of said isolating means, and a purge system connected to said second connection and having a source of purge fluid, a control valve and a purge fluid meter.

* * * * *

REEXAMINATION CERTIFICATE (1234th)
United States Patent [19]
Hewson et al.

[11] B1 4,319,492
[45] Certificate Issued Apr. 3, 1990

[54] PRESSURE TRANSMITTER MANIFOLD

[75] Inventors: John E. Hewson; Marion L. Schomer, both of Houston, Tex.

[73] Assignee: Keystone International Holdings Corp., Houston, Tex.

Reexamination Request:
No. 90/001,753, Apr. 14, 1989

Reexamination Certificate for:
Patent No.: 4,319,492
Issued: Mar. 16, 1982
Appl. No.: 114,572
Filed: Jan. 23, 1980

[51] Int. Cl.[4] ................................................ G01L 7/00
[52] U.S. Cl. .................................................... 73/756
[58] Field of Search .................... 73/756, 714, 115; 137/340, 886, 883

[56] References Cited
U.S. PATENT DOCUMENTS

| | | | |
|---|---|---|---|
| 1,272,344 | 7/1918 | Bristol | 73/756 |
| 1,532,253 | 4/1925 | Meredith et al. | 137/883 |
| 1,534,406 | 4/1925 | Martocello | 137/544 |
| 1,797,591 | 3/1931 | Sartakoff | 73/756 |
| 1,998,830 | 4/1935 | Beebe | 137/883 |
| 2,390,301 | 12/1945 | Hart | 73/756 |
| 2,871,881 | 2/1959 | Hewson | 73/861.42 |
| 2,936,000 | 5/1960 | Mason | 73/756 |
| 3,118,463 | 1/1964 | Lacart | 137/886 |
| 3,196,688 | 7/1965 | Smith | 73/732 |
| 3,499,464 | 3/1970 | Williams et al. | 137/883 |
| 4,082,002 | 4/1978 | Baugh | 73/756 |
| 4,174,729 | 11/1979 | Roark et al. | 137/487.5 |
| 4,182,362 | 1/1980 | Hewson et al. | 137/340 |
| 4,319,492 | 3/1982 | Hewson et al. | 73/756 |

*Primary Examiner*—Donald O. Woodiel

[57] ABSTRACT

A pressure transmitter manifold having a block with an inlet in communication with a pair of outlets, valve means controlling communication between the inlet and said outlets, valve controlled bleed and test connections in communication with said outlets and means for supporting said manifold block in a preselected position.

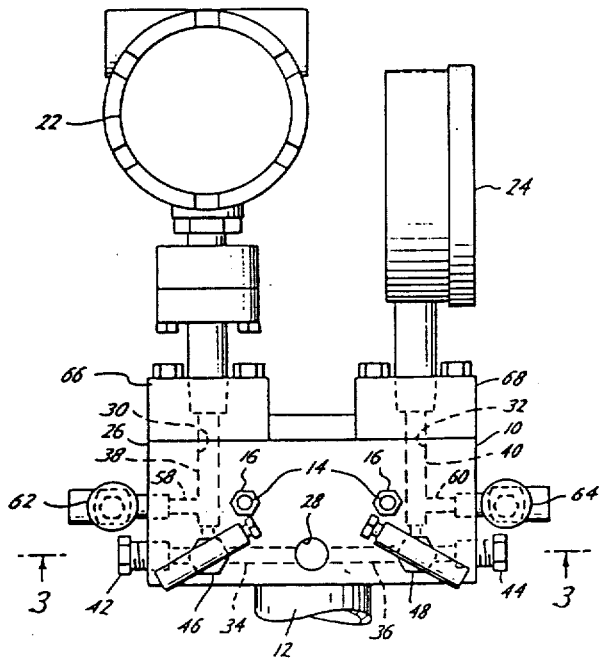

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–7 is confirmed.

Claims 1 and 2 are determined to be patentable as amended.

1. A pressure transmitter manifold comprising
a body,
an inlet into said body,
a pair of ports into said body,
a first passage through said body between said inlet and one said ports,
a second passage through said body between said inlet and the other of said ports,
said inlet supplying a common pressure to both of said ports,
a first valve in said body controlling communication through said first passage,
a second valve in said body controlling communication through said second passage,
a first bleed connection into said block communicating with said first passage between said first valve and said connection,
[means] *a third valve for opening and* closing said first bleed connection,
a second bleed connection into said block communicating with said second passage between said second valve and said connection,
[means] *a fourth valve for opening and* closing said second bleed connection, and
means for mounting said block in a preselected position.

2. A pressure transmitter manifold comprising a body,
an inlet into said body,
a pair of ports into said body,
a first passage through said body between said inlet and one of said ports,
a second passage through said body between said inlet and the other of said ports,
said inlet supplying a common pressure to both of said ports,
a first valve in said body controlling communication through said first passage,
a second valve in said body controlling communication through said second passage,
a first bleed connection into said block communicating with said first passage between said first valve and said one of said ports,
[means] *a third valve for opening and* closing said first bleed connection,
a second bleed connection into said block communicating with said second passage between said second valve and the other of said ports, and
[means] *a fourth valve for opening and* closing said second bleed connection.

* * * * *